March 10, 1925.  
H. A. MYERS  
GEAR CUTTING APPARATUS  
Filed Sept. 20, 1920 5 Sheets-Sheet 1

INVENTOR
Hubert A. Myers.
By Owen Owen & Crampton
His attys.

March 10, 1925.  1,529,267
H. A. MYERS
GEAR CUTTING APPARATUS
Filed Sept. 20, 1920    5 Sheets-Sheet 2
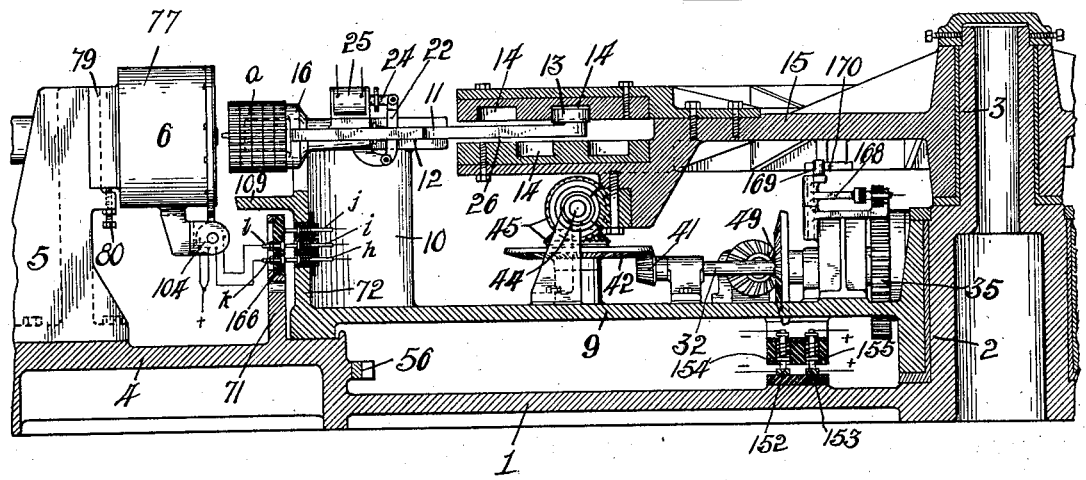
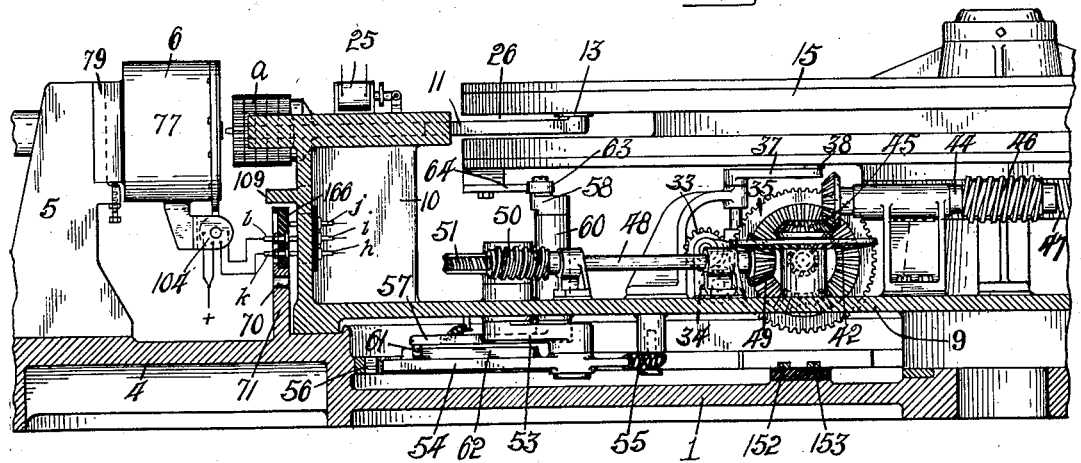
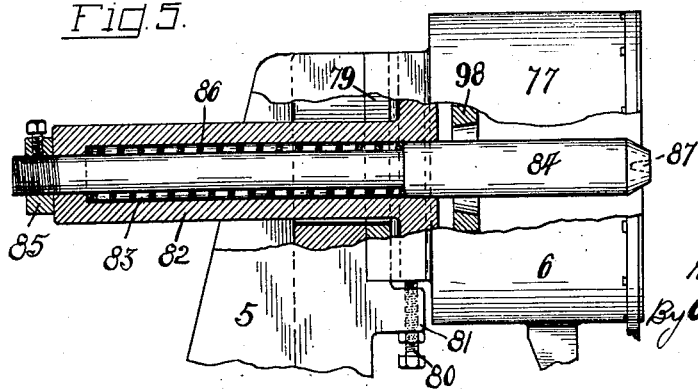
INVENTOR
Hubert A. Myers.
By Owen Owen & Crampton
his attys.

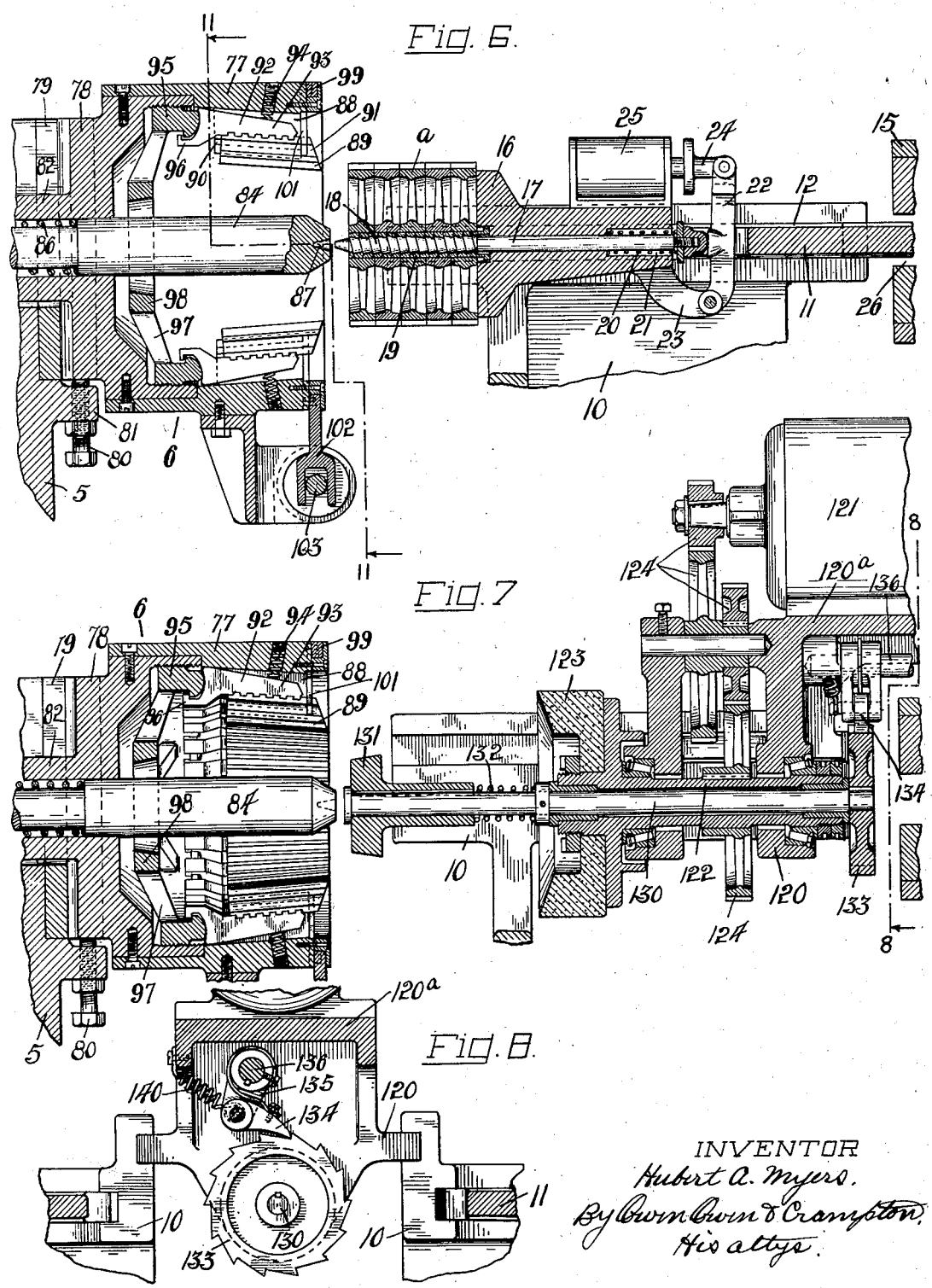

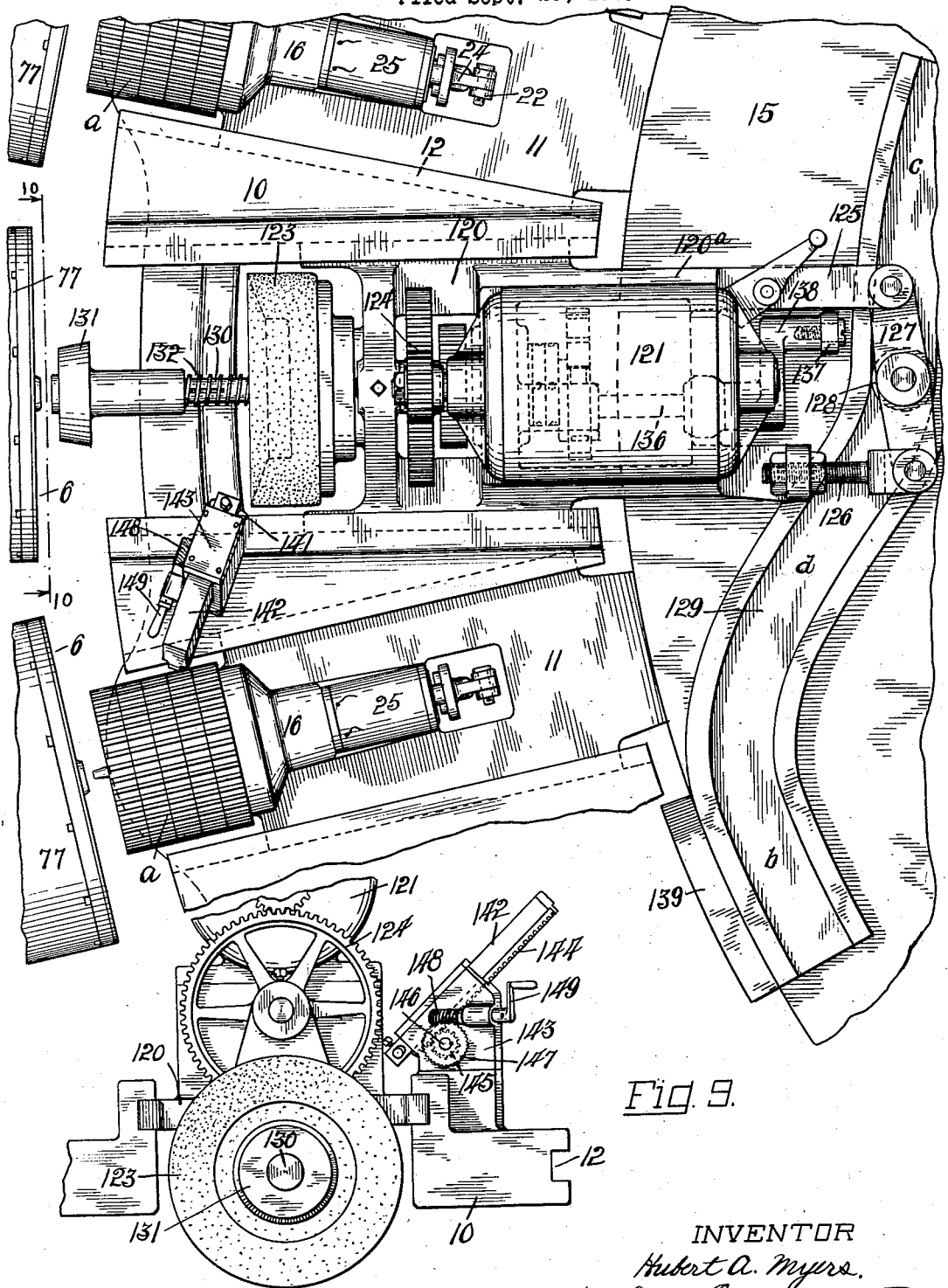

March 10, 1925.
H. A. MYERS
GEAR CUTTING APPARATUS
Filed Sept. 20, 1920   5 Sheets-Sheet 5
1,529,267
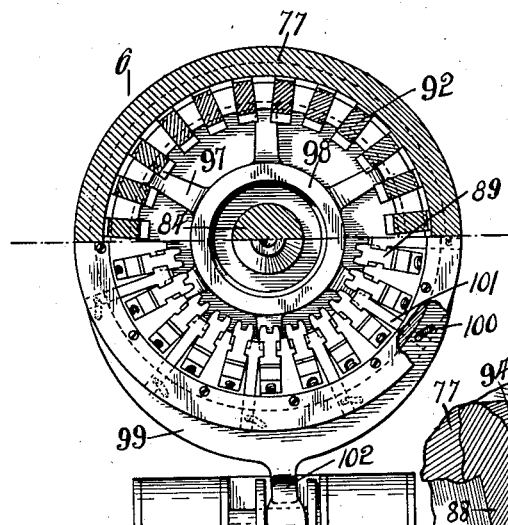
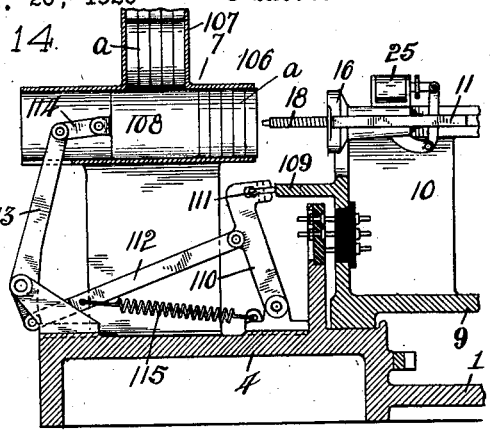
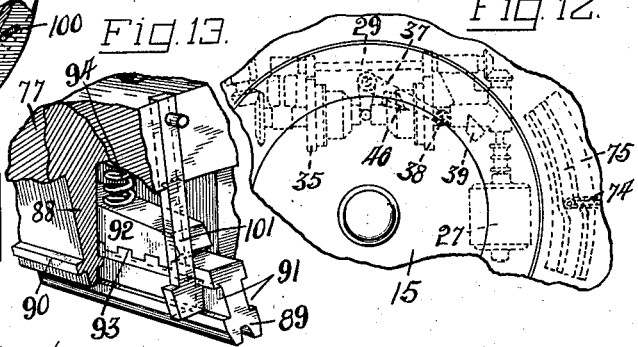
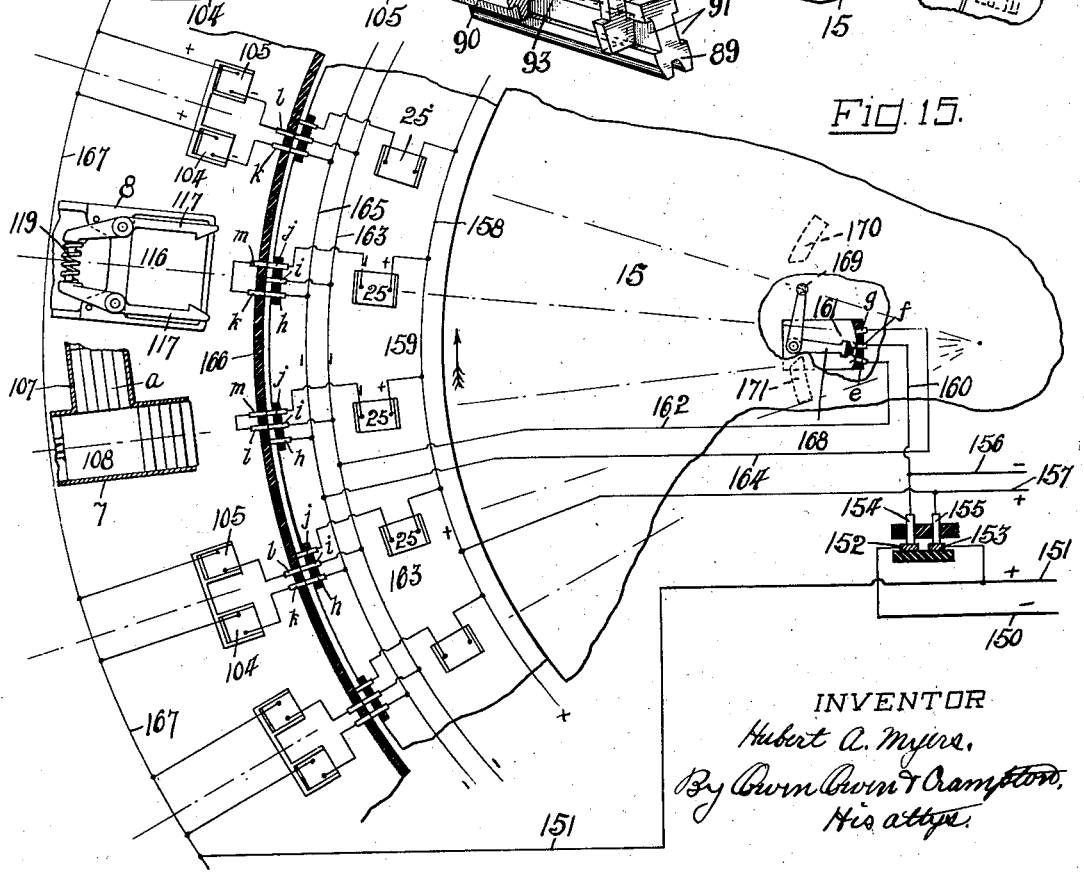
INVENTOR
Hubert A. Myers.
By Owen Owen & Crampton,
His attys.

Patented Mar. 10, 1925.

1,529,267

UNITED STATES PATENT OFFICE.

HUBERT A. MYERS, OF TOLEDO, OHIO, ASSIGNOR TO THE HUBERT A. MYERS COMPANY, OF TOLEDO, OHIO, A CORPORATION OF OHIO.

GEAR-CUTTING APPARATUS.

Application filed September 20, 1920. Serial No. 411,475.

*To all whom it may concern:*

Be it known that I, HUBERT A. MYERS, a citizen of the United States, and a resident of Toledo, in the county of Lucas and State of Ohio, have made an Invention Appertaining to Gear-Cutting Apparatus; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to the cutting of gears and particularly those of the spur tooth type.

An object of the invention is the provision of a machine which is automatically operable to successively feed gear blanks to a carrier, successively act on the blanks to progressively cut teeth thereon, and then discharge the cut gears from the carrier preparatory to receiving others for cutting.

A further object of the invention is the provision of simple and efficient means for effectively clamping and holding one or more gears during the successive operations.

A further object of the invention is the provision of easily operable means for sharpening the cutters at predetermined intervals.

Further objects and advantages of the invention will be apparent from the following detailed description thereof.

While the invention is capable of numerous modifications, a preferred embodiment thereof is illustrated in the accompanying drawings, in which,—

Figure 1:
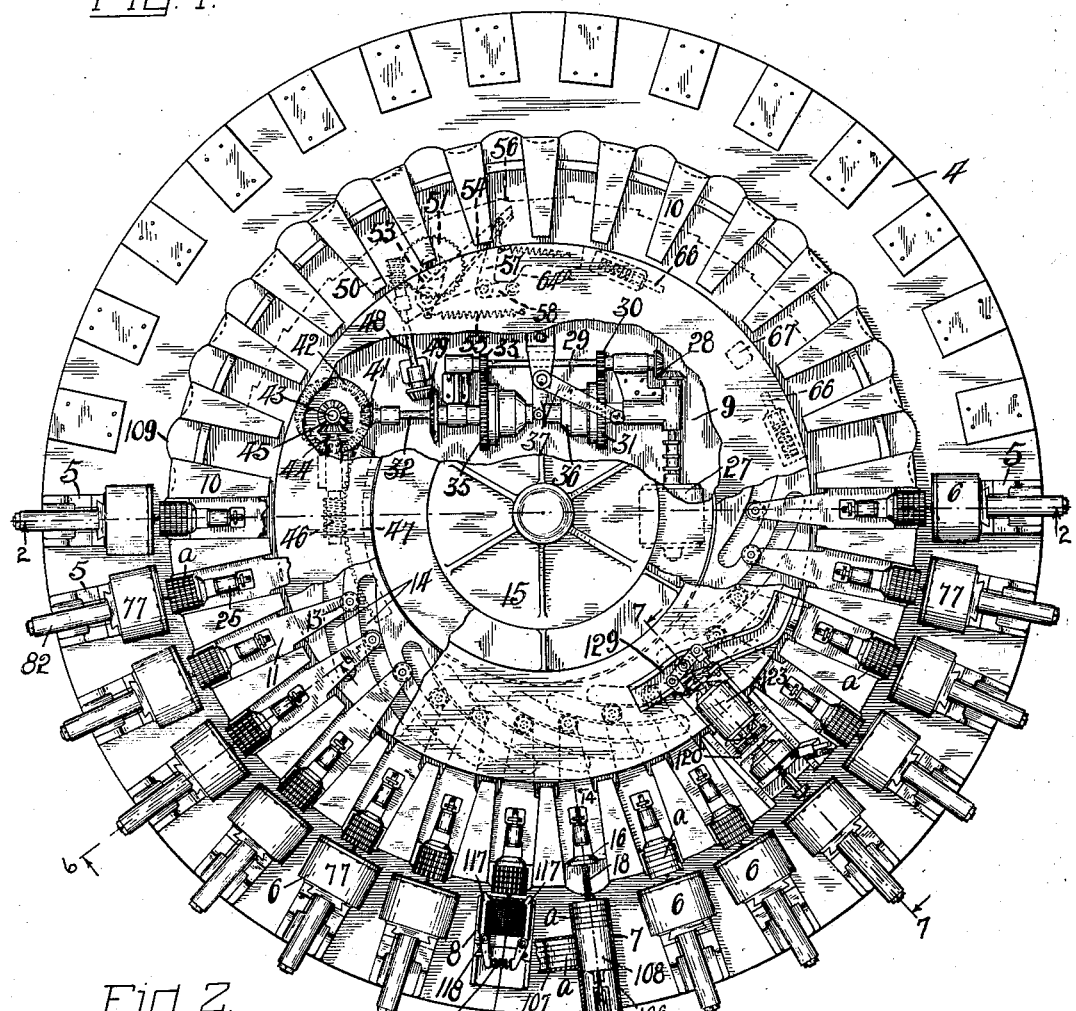
Figure 2:
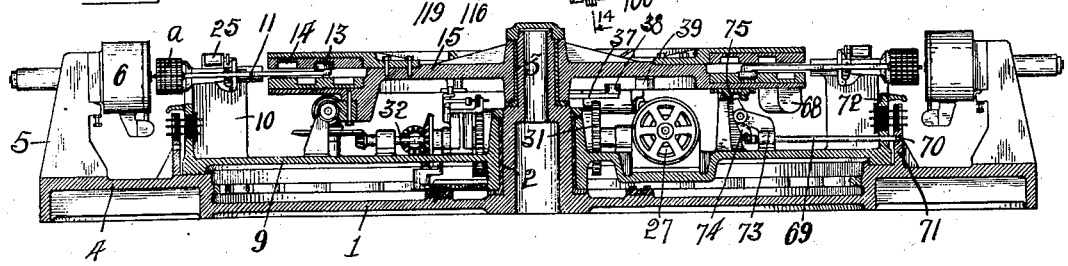

Figure 1 is a top plan view of the machine with some of the gear carriers and cutter heads removed and with parts broken away. Fig. 2 is a central vertical cross-section thereof. Fig. 3 is an enlarged section like the left portion of Fig. 2. Fig. 4 is an elevation with parts in section showing the driving means for the carrying table. Fig. 5 is an enlarged side elevation of one of the cutter-heads with a portion broken away. Fig. 6 is an enlarged fragmentary sectional vertical axial section through one of the cutter-heads and associated gear carriers, with the latter carrying a set of gear blanks and in retracted relation to the former. Fig. 7 is an enlarged fragmentary section on the line 7—7 in Fig. 1. Fig. 8 is a fragmentary section on the line 8—8 in Fig. 7. Fig. 9 is an enlarged fragmentary plan view of a portion of the machine embodying the cutter sharpening means. Fig. 10 is a fragmentary outer end elevation of the sharpening means. Fig. 11 is a section on the line 11—11 in Fig. 6. Fig. 12 is a plan of a portion of the oscillatory cam-table above a portion of the driving mechanism therefor. Fig. 13 is a perspective view of one of the cutters and a portion of the guide and controlling means therefor. Fig. 14 is an enlarged section on the line 14—14 in Fig. 1, and Fig. 15 is a diagram of a portion of the electric wiring in connection particularly with the loading and ejecting heads and a portion of the cutter-heads.

Referring to the drawings, 1 designates the stationary machine base, which is circular in form and has a stepped bearing standard rising from its center and forming journals 2 and 3, and also has a raised circular rim portion 4. A circular series of equidistantly spaced standards 5 rise from the base rim 4 adjacent to its outer edge portion in concentric relation to the center standard, and each standard 5, excepting two, carries a cutter-head 6 (28 of such heads being provided in the present machine), and one of the two remaining standards, which adjoin each other, carries a loading-head 7 while the other carries a stripping or discharge head 8.

A circular carrier table 9 has a bearing on and is adapted to turn about the center journal 2, which is the lower of the pair, and the outer rim of the table extends over the inner edge of the base rim 4 and has a bearing thereon. The table 9 is intended to have intermittent rotary movements in one direction periodically imparted thereto by suitable mechanism hereinafter described, the gear loading, cutting and discharging operations taking place during the periods of rest of the table. A circular series of equidistantly spaced standards 10 rise from the outer edge portion of the table within the circle described by the inner faces of the series or heads 6, 7 and 8 and are of a number to provide a radial space therebetween for each of said heads and adapted to radially register therewith when the table is at rest.

A carrier-slide 11 is mounted in each of the spaces, except one, between the standards 10, and has its side edges mounted in horizontal guide grooves 12 in the adjacent upper edge portions of the standards to permit the slide to have inward and outward radial movements relative to the table and to the head 6, 7 or 8 with which it registers. Each slide 11 projects at its inner end within the circle formed by the standards 10 and carries a roller 13 at such end for engagement in a respective cam-groove 14 in a circular cam-table 15, whereby rotary reciprocatory movements of the table will impart radial reciprocatory movements in unison to the several slides of the set. Each slide 11 has a head 16 at its outer end adapted to carry one or more gear-blanks a for movements into and out of the registering head 6, 7 or 8.

For the purpose of carrying a set of gears or blanks a, each carrier-head 16 has a spindle-rod 17 projecting therethrough in axial register with a registering head 6, 7 or 8 and from the outer end of the carrier head. The projecting outer end of the spindle is provided with a spiral conical groove 18 and encircled by a spiral ribbon or expanded clutch bushing 19, which is anchored against endwise movement to the head 16 and has its inner surface fitting the groove 18 whereby, when the bushing is contracted, an inward movement of the spindle-rod will effect an expansion thereof. The spindle-rod is normally retracted to expand the clutch bushing by a coiled expansion spring 20, which encircles the rear end of the rod within a socket 21 in the carrier-head and has its opposite ends thrust against the base of the socket and a shoulder on the rod. The spindle-rod is moved outward against the tension of the spring by a lever 22, which extends vertically through an opening in the slide 11 and is fulcrumed at its lower end to a bracket-arm 23, projecting from the head 16, and has its upper end pivoted to the outer projecting end of a core 24 of a solenoid 25, whereby an electrical energization of the core will impart an outward movement to the rod and release or contract the clutch-bushing. The clutch-bushing is of a size to adapt it when contracted to be freely inserted into the hub opening of the gears a, and upon an expansion of the bushing the gears are firmly held thereon in end abutment one with another and with the inner one in end thrust abutment with the outer end of the carrier-head.

The cam-table 15 is mounted for horizontal rotation on the upper journal 3 of the central base standard and is provided in its rim periphery with a horizontally disposed annular recess 26 in which the inner ends of the slides 11 project. The upper and lower walls of this recess are both provided with cam grooves 14 arranged close together and receiving the rollers 13, one groove being provided for each roller. The cam grooves are of parallel arcuate form eccentric to the table axis so that a turning of the cam-table in clock-wise direction will force all of the slides 11 and carrier-heads outward in unison, while a turning of the table in the opposite direction will uniformly retract the slides. Due to the closeness of the grooves, one-half are provided in one wall and one-half in the other wall of the recess 26, with each half receiving alternate rollers 13. The grooves 14 are provided in the present instance in hardened face plates forming the walls of the recess 26. During a running of the machine the cam-table 15 has a constant, uniform, rotary, reciprocatory movement imparted thereto to transmit successive inward and outward movements to the carrier-heads 16 to move the gears or work-pieces a into and out of the respective registering heads 6, 7 and 8. During a portion of each clockwise movement of the cam-table, the carrier-table 9 is moved forward therewith to advance the several carrier-heads one step and place each in register with the next head 6, 7, or 8. It is intended that during each cycle of operations in cutting the teeth on a gear blank a such set will be delivered to each carrier-head 16 when in register with the loading-head 7, will then be successively acted on by the succeeding cutter-heads 6 to progressively cut the teeth thereon, each cutter-head performing a predetermined cutting operation, and when the cutting of the teeth is completed by the last cutter-head of the set, the gears will be moved into register with the discharge head 8, so that upon the next outward movement of the carrier-head the finished gear set will enter the head 8 and be stripped from the carrier-head upon the succeeding receding stroke of the carrier-head, as hereinafter more fully described.

The driving power is received from an electric motor 27 mounted on the carrier-table 9, the motor shaft having beveled gear connection 28 with a countershaft 29, which has a pinion 30 in direct driving connection with a gear 31 on a clutch shaft 32 and has a second pinion 33 in connection through a pinion 34 (Fig. 4) with a second gear 35 on the shaft 32. The gears 31 and 35 are loose on the shaft 32 and one or the other is clutch connected therewith by shifting in the desired direction a clutch sleeve 36 mounted therebetween on the shaft. Clutches of this character are so common as not to require specific illustration and description. The clutch sleeve 36 is shifted into engagement with one or the other of the gears 31 and 35 by rocking movements of a bell crank lever 37, the long arm of which carries a roller 38 at the top side of its free end between a pair of spaced cam lugs 39 and 40 on the underside of the cam-table 15 (see Fig. 12), whereby upon a predetermined movement of the cam-table to the left the cam lug 39 will strike the roller and move the lever and clutch sleeve to disengage the forward driving gear 31 and engage the reverse driving gear 35 to drive the cam-table to the right until the clutch is again shifted by coaction of a cam lug with the clutch lever. The clutch-shaft 32 has a small beveled gear 41 in mesh with a larger beveled gear 42 on a short vertical shaft 43, and this shaft is in turn in driving connection with a horizontal worm shaft 44 through a pair of beveled gears 45. Each of the shafts 29, 32, 43 and 44 is journaled in suitable bearings on the carrier-table 9 so that the driving mechanism described is carried by and moves with said table. The worm 46 on the shaft 44 meshes with a segmental rack 47 fixed to the under side of the cam-table 15 so that the cam-table will be driven a predetermined distance in first one and then the other direction by the successive forward and reverse driving movements of the driving mechanism.

The means employed to intermittently advance the carrier-table 9 relative to the heads 6, 7 and 8 will now be described. A shaft 48 is driven from the shaft 32 through a beveled gear connection 49 and is journaled in suitable bearings on the carrier-table 9 (Figs. 1 and 4). A worm 50 on the shaft 48 meshes with and drives a worm-wheel 51, the vertical shaft of which is journaled through the table 9 and carries a crank arm 53 below the table.

A pawl 54 is pivotally carried by the wrist pin of the crank arm and is urged by a spring 55 to normally engage an annular series of ratchet teeth 56 provided on the inner periphery of the base rim 54 so that when the crank arm is turning in clockwise direction with the pawl in engagement with the ratchet teeth, the table 9 will be moved forward a distance equal to the space between the axes of two adjoining heads 6, 7, or 8, the stroke of the pawl being sufficient for that purpose. A pair of rocker arms 57 and 58 are carried at opposite ends of a vertical shaft 59, journaled through the table 9 in a bearing 60, the arms and shaft cooperating to form a bell crank lever with the lower arm 57 provided at its end with a transverse pin 61 in sliding engagement with the outer side of a flange 62 on the top side of the pawl 54 lengthwise thereof so that the pawl may be withdrawn and held from engagement with the ratchet teeth 56 by the lever. The upper arm 58 carries a roller 63 in engagement with a cam 64 on the bottom of the cam-table 15, the formation of the cam being such that the lever 57—58 will hold the pawl 54 from engagement with the ratchet during approximately the first two-thirds portion of each movement of the cam-table 15 in counter-clockwise direction, and when it has reached approximately the position shown in Fig. 1 with respect to the carrier slide 11, the lever roller will pass outward along a cam portion 64² of the cam and permit the pawl 54 to engage a registering ratchet tooth and remain in such engagement during the remainder of the stroke of the cam-table. The forward movement of the pawl by the revolution of its carrying crank 53 during its engagement with the ratchet will impart the requisite forward movement to both the cam and carrier-table to advance the carrier-heads one step. A spring 65 acts on the bell-crank lever 57—58 to normally hold the roller 63 in engagement with the cam 64.

In order to cushion the cam-table 15 at the end of each stroke, two cushion pins 66 are carried in annularly spaced relation by the table at its underside and coact with a post 67 rising therebetween from the table 9. The pins and their cushion springs are carried by bosses 68 on the cam-table.

During the portion of each outward movement of the carrier slides 11, when the carrier-heads thereof enter the respective carrier-table heads 6, 7 or 8 on the case, the carrier-table 9 is locked against movement relative to the base by a locking pin 69 (Fig. 2), entering a registering hole 70 of a series provided in an annular flange 71 entirely therearound. This flange rises from the base rim immediately without the table edge 9 and is eccentric to the table axis. The pin 69 projects through and is guided at its outer end by an annular flange 72 rising from the outer edge of the table 9 and is guided at its inner end by a standard 73 on said table. A vertically disposed lever 74 is fulcrumed to the standard 73 above the pin 69 and has its lower end pivoted to the adjacent pin end and its upper end preferably provided with an anti-friction roller and projecting into a cam groove 75 provided on the under side of the cam-table 15. This groove is adapted to impart a predetermined inward pin withdrawing movement to the lever during a portion of the movement of the cam-table in counter-clockwise direction and to move the pin outward to locking position when the cam-table is moved in clockwise direction relative to the table 9. The movement of the pin is gauged, however, so that there is no locking action between it and the base flange 71 during the period of shifting movement of the carrier-table which takes place during the last third movement of the cam-table 15 in counterclockwise direction.

Each cutter-head 6 (see particularly Figs. 5, 6 and 7) comprises a cylindrical shell 77 having its axis horizontally disposed and being closed at its outer end and open at its inner end to permit axial movements therein of the carrier-head spindles and gear sets carried thereby. The closed end of the head is provided at its outer side with a vertical dove-tail 78 for interengagement within a dove tail groove on the inner side of the upper end portion of the associated base standard 5, such groove in the present instance being formed in a plate 79 suitably secured to the standard. The head is vertically adjusted with respect to the standard by a screw 80, which threads through a boss 81 on the standard at the base of the dovetail 78.

The standard 5 has its top forked, and a stem 82 projects from the rear or outer closed end of the shell 77 through the fork opening. This stem is hollow to form a socket 83, which opens into the interior of the shell and receives a plunger 84 for reciprocatory movements therein. The plunger 84 has its rear end reduced to project through an opening in the socket bottom and the reduced end of the plunger carries a collar 85 without the rear end of the stem for coaction therewith to limit the forward movements of the plunger. A coiled expansion spring 86 encircles the reduced portion of the plunger within the socket 83 with its opposite end-thrust against the bottom of the socket and a shoulder on the plunger to normally retain the plunger at the limit of its forward movement. The plunger 84 is intended to act as an outer end bearing for the spindle-rod 17 when such rod with a set of gears is forced into the cutter-head, thereby assisting in holding the gears truly centered within the cutter-head. For this purpose the spindle-rod 17 has its outer end projecting beyond the gear set and of conical form to fit into a complemental socket 87 in the plunger end.

The shell 77 is provided in its outer end portion with an annular series of interior longitudinally extending ribs 88 spacing to form guides for chasers 89, one of apart transversely of the head and cooperating to form guides for chasers 89, one of which is disposed in the space between each adjoining pair of ribs. The chasers are guided by the ribs 88 for longitudinal adjusting movements lengthwise of the shell at an incline to its axis, the chasers, in the present instance, being guided by flanges 90 on the sides of the ribs 88 entering side grooves 91 in the chasers. The grooves 91, in the present instance, are of greater width than the flanges 90 to permit limited radial play of the chasers in the spaces between the ribs 88 to provide clearance between the chasers and gears during an outward retracting movement of the latter, as hereinafter described. The incline of the chasers is such that the forward cutting ends thereof are disposed more closely together than the rear inner ends thereof, as shown. The cutting ends or noses of the chasers are cut on a bevel so that the cutting point of each chaser forms an acute angle. A chaser holding bar 92 projects into the space between each pair of ribs 88 from the inner end of the shell cavity at the outer side of each chaser and has a plurality of teeth on its inner side which interengage with similar teeth on the outer or adjacent side of the respective chaser, as shown at 93, so that when the teeth are engaged the bars may oppose an end thrust on the chasers. The bars 92 are yieldingly held in engagement with the chasers by coiled compression springs 94 which project into the spaces between the ribs 88 from sockets in the shell wall and bear inward against the outer sides of the respective chaser bars 92. The inner ends of the chaser-bars have pivotal longitudinal thrust bearings against the outer circular edge of a ring 95, which is threaded in the rear end portion of the shell 77 for adjustment longitudinally thereof. The bars 92 are held to the ring 95 by hooks 96 on the bars engaging around the adjacent inner hooked edge of the ring as shown. The ring 95 has arms 97 projecting inwardly therefrom and carrying at their inner ends a hub ring 98, the opening of which is enlarged with respect to the plunger 84, being concentric thereto and of conical form for the purpose hereinafter described. The chasers 89 may be formed to cut one or more gear teeth, and, in the present instance, are formed to cut one complete tooth and the adjoining side of a tooth at each side of the complete tooth (see particularly Figs. 11 and 13).

A cam ring 99 is mounted for rotary movements in an annular groove provided peripherally in the outer end edge portion of the shell 77, and this ring is provided with a plurality of cam slots 100 one of which is provided for each pair of chasers 89 of the set and in position to register with the space between the chasers of the pair. A plurality of trip bars 101 are mounted for radial movements in the shell at the inner side of the ring 99, one being provided for each slot 100 and having a pin projected into such slot whereby a turning of the cam ring 99, will impart predetermined radial movements to the trip bars. A trip-bar 101 projects at its inner end between the chasers of each pair at the forward ends thereof and has an enlargement which fits into the adjacent grooves 91 of the adjoining chasers so that radial movements of the trip bar will impart radial movements to the outer ends of the engaged chasers, such movement being permitted by reason of the play between the chaser grooves and the guide flanges 90 and also by reason of the yielding of the springs 94. It is thus evident that upon a movement of the cam ring 99 in one direction, all of the chasers are uniformly forced inward to cutting position and upon a movement of the cam ring in the opposite direction are uniformly forced outward to released or clearance position with respect to the work being cut. A forked arm 102 projects downward from the bottom portion of the cam-ring 99 and straddles the common core bar 103 of two solenoids 104 and 105, the arm fitting between shoulders on the core bar. It is thus evident that when the coil of one solenoid is energized the movement of the core and cam-ring is in one direction and that when the coil of the other solenoid is energized the movement of the core and cam-ring is in the opposite direction. The energization of the solenoid is automatically controlled as hereinafter described.

The loading-head 7 of the machine comprises a cylindrical casing 106 with a supply chute 107 communicating with one side thereof. A plunger 108 is mounted in the casing 106 for rearward and forward movements relative to the chute 107 to permit a set of work blanks $a$ to feed into the casing 106 in advance of the plunger and to then be moved thereby to the forward end of the casing in position for a registering carrier-head spindle clutch to enter the same upon an outward movement of the carrier-head. During a movement of the carrier-head spindle into a set of work pieces $a$, the clutch of the spindle is held contracted by the energizing of the associated solenoid 25, which takes place during the outward movement of the carrier-head receiving a load. The gear blanks feed in sets of five down the chute 107 and when the plunger is retracted the advance set enters the casing 106 and is then advanced into loading position by the forward movement of the plunger. The plunger is controlled in its movements from an undulated cam 109 (Fig. 14), provided entirely around the upper outer edge portion of the flange 72 rising from the edge of the carrier-table 9. A vertically-disposed rocker-arm 110 is pivoted to the base rim 4 for radial rocking movements relative thereto and is provided at its upper end with a roller 111, which bears inward against the peripheral edge of the cam. A bar 112 connects the rocker-arm 110 with a rocker-arm 113, which rises from the outer edge portion of the base 4 and is pivotally connected at its upper end to a pitman or rod 114 in connection at its inner end with the plunger 108. A contractile spring 115 connects the arm 113 to the standard carrying the head 7 and acts to move the plunger outward and to retain the roller 111 in contact with the coacting cam. The cam is of proper formation, as shown in Fig. 1, to impart the necessary rearward and forward strokes to the plunger during the retracting strokes of the carrier-heads and the initial portions of the feed strokes thereof.

The unloading head 8 comprises the upper open end of a discharge chute 116 (Fig. 1) and is in proper position for an associated carrier-head, when at its limit of outward movement, to have its load of gears $a$ disposed thereover. As the load of gears are forced outward over the chute 116 they pass between a pair of tongs or hooked fingers 117, which are pivoted at 118 for horizontal movements and are adapted to have hooked engagement at their free ends with the rear edge of the inner gear of the set when the gears have been moved outward substantially to discharging position. The spring fingers are yieldingly held in gear gripping position by a spring 119 disposed between tail pieces thereon. When the carrier-head is approximately at load discharging position the associated solenoid 25 is energized to impart an outward movement to the spindle rod 17 to permit a contraction of the clutch bushing 19, such energizing continuing until the cutter-head has substantially completed its rearward or contracting stroke thereby permitting the clutch spindle to be withdrawn from the set of cutting-gears while the gears are held against retracting movement with the cutter-head by the catch fingers 117. The means for controlling the energizing and deenergizing of the magnet 25 at the load discharging point will be hereinafter described.

In the space between one of the pairs of standards 10 of the carrier-table 9 is mounted a slide 120 (see Figs. 7, 8, 9 and 10) in the same manner that the carrier-slides 11 are mounted between the other pairs of standards of the set, and an electric motor 121 is mounted on an elevated rear end portion 120ª of the slide. A shaft 122 is journaled in the slide 120 in radial relation to the axis of the carrier-table 9 and in position to axially register with the center of a cutter-head at each period of rest of the carrier-table, except when the shaft is opposite the unloading and loading heads of the machine. A grinding wheel 123 is carried by the shaft 122 at its outer end in position to coact at its outer side with the outer ends of a set of aligned chasers 89 when moved outward to grind the same upon an outward movement of the slide frame 120. The shaft 122 has high speed gear connection with the motor through a train of gears 124. The slide frame 120ª has a pair of horizontally spaced arms 125 and 126 projecting rearward therefrom and these arms are connected by a cross-bar 127 pivoted to each and carrying a roller 128 intermediate the arms for travelling in a cam-groove 129 on the top of the cam table 15. This groove is of a length corresponding substantially to the stroke length of the cam table 15 and is provided with neutral end portions $b$ and $c$ and with an intermediate cam portion $d$. The traversing of the cam portion by the roller 128 during a clockwise movement of the cam table imparts an outward stroke to the slide 120, and vice versa. It will be understood that the length of the neutral portion $b$ of the cam groove determines the period of engagement of the grinding wheel with the chasers. An adjustment of the slide 120 relative to the cam groove to compensate for wear of the grinding wheel may be accomplished by an adjustment of the length of the arm 126, which is adapted for such purpose.

A shaft 130 is journaled in and extends through the hollow of the shaft 122 with its outer end extending in position to have end thrust engagement with a registering cutter-head plunger 84 at approximately the time of engagement of the outer ends of the carrier-head spindles 17 with the aligned plunger 84 upon an outward movement of the respective slides, the plunger being forced inward by the continued outward movement of the shaft. When the trimmer slide 120 is approximately at the limit of its outward movement, a conical friction wheel 131 on the outer end of the shaft 130 enters the conical opening formed by the ring 98 within the cutter-head, the wheel being permitted to move axially on the shaft to allow for any further movement of the shaft due to the wheel being splined on the shaft and held in its outermost position by a coiled expansion spring 132. A ratchet wheel 133 is fixed to the inner end of the shaft 130 and the teeth of this wheel are engaged by a pawl 134 carried by a rocker arm 135 on a rocker shaft 136 journaled in the frame 120ª. When the trimmer-slide 120 is at the limit of its outward movement and the roller 128 thereof is traversing the neutral end portion $b$ of the cam groove 129, a roller 137 on the wrist-pin of a crank-handle 138, carried by the rear end of the shaft 136, engages and travels over a cam 139 on the cam table 15 and imparts a predetermined rocking movement to the shaft 136 and from it through the pawl and ratchet 133 to the shaft 130 and wheel 131. This movement of the wheel 131 imparts a corresponding movement to the adjusting spider formed by the rings 95, 98 and spokes 97 in a direction to cause a slight outward adjustment of the bars 92 and chasers 89 by reason of the threaded connection of the ring 95 with the shell 77. The adjustment which is thus imparted to the chasers of each head at each cycle of operations is sufficient to compensate for wear and to permit a sharpening of the ends of the chasers by the grinding wheel 123, the stroke of movement of which is constant. A coiled spring 140 connects the rocker arm 135 to the slide frame 120ª and acts to return the shaft 136 and parts carried thereby to normal position after the roller 137 leaves the cam 139.

To provide for trimming the grinding wheel 123 at desired intervals, I mount a trimmer point 141 on a slide bar 142, the bar being moved to cause the point to pass across the trimming face of the trimming wheel when the wheel is in its retracted position, as shown in Fig. 9. The bar is mounted for movement in a standard 143 and has a rack 144 on its bottom engaging with the pinion 145. On the shaft 146 with the pinion is a worm wheel 147 with which a drive worm 148 engages, and on the worm shaft is a hand crank 149 to permit manual adjustment of the trimmer bar 142.

The electric wiring for the different electrically controlled parts is illustrated diagrammatically in Fig. 14, in which 150 and 151 designate the main negative and positive leads respectively, having connection with respective conductor rings 152 and 153 insulatingly mounted on the base 1 in encircling concentric relation to its axis. A pair of electric brushes 154 and 155 are insulatingly carried by the carrier-table 9 at its underside in position to have continual sliding contact on the respective rings 152 and 153, the brushes being preferably held in yielding contact with the rings, as shown in Fig. 3. When the machine is operating the two brushes are in continual connection with the drive motor 27 and trimmer motor 121 through leads 156 and 157, and the positive lead 157 also has connection with a wire 158 extending around the machine and from which a lead 159 extends to the positive side of the coil of each solenoid 25, which solenoids control the releasing of the carrier-head spindle clutches. The negative wire 156 has a lead 160 extending to the center one of three switch contacts $e$, $f$ and $g$ of a switch 161. The outer contact $e$ has a lead 162 extending therefrom to a wire 163 extending around the machine while the contact $g$ has a lead 164 extending to a wire 165 extending around the machine. The switch 161 and wires 158, 163 and 165 are carried by the table 9 to turn therewith. The table flange 72 carries a set of three contact brushes $h$, $i$ and $j$ which yieldingly bear at their outer ends against an insulation ring 166 on the base flange 71 except when moved into register with respective contacts $k$, $l$ and $m$ in said ring. Each brush $h$ has connection with the wire 165, and each brush $i$ has connection with the wire 163, while each brush $j$ has connection with the negative side of the coil of each solenoid 25. The contacts $k$ and $l$ of each set in association with a cutter-head has connection with the negative side of the coils of the respective solenoids 104 and 105, which control the radial inward and outward movements of the chasers. The positive side of the coil of each of these solenoids is connected to a positive lead wire 167 extending from the main positive lead 151. Only the contacts $l$ and $m$ are provided in association with the loading head 7 and these are cross-connected, while only contacts $k$ and $m$ are in association with the unloading head and these are cross-connected.

The movable member of the switch 161 comprises a bell-crank lever 168 having a bridging U-shaped contact brush on the end of one arm adapted to bridge the space between either the contacts $e$ and $f$ or $f$ and $g$, depending on the position of the lever. The other arm of the lever carries a roller 169 which, when the cam-table 15 is approximately at the limit of its forward stroke, is engaged by a cam 170 on the table to cause a movement of the lever to bridge the connection between the contacts $e$ and $f$, as shown in Fig. 14, and when the table 15 is at the limit of its stroke in the opposite direction the lever roller is engaged by a cam 171 on the table and the lever is moved to bridge the contacts $f$ and $g$.

With the lever 168 in the position shown and the cam table 15 moving rearward or in clockwise direction, during which movement the carrier-table 9 is stationary, the circuit of each solenoid 25, whose carrier-head is in register with a cutter-head 6, is open, as it will be noted that the connection to the negative side of each of such solenoid coils is broken between the brushes $i$ and $j$. This leaves the spindle clutch of each associated carrier-head in work holding position. When a carrier-head 16 has moved into register with the unloading head 8 the brushes $h$ and $j$ will be bridged by the contacts $k$ and $m$ so that the connection between the negative wire 165 and the negative side of the associated solenoid 25 is closed. The wire 165 is not, however, in closed circuit with the main lead wires due to the brush of the switch 161 connecting the contacts $e$ and $f$ and not $f$ and $g$. When the cam table 15 has approximately reached its limit of movement in clockwise direction, at which point the carrier heads 16 will be approximately at their limits of outward movement, the switch lever 168 will be engaged by the contact 171 and moved to open the connection between the contacts $e$ and $f$ and to close the connection between the contacts $f$ and $g$ of the switch. The closing of the latter contacts closes the circuit with the solenoid 25, which is then associated with the unloading head so that the solenoid is energized to effect a release of the spindle holding the compressed set of gears, whereupon at the next retracting stroke of the cutter-heads the gears disposed within the unloading head will be stripped from the spindle and permitted to drop down into the discharge chute 116, the spindle clutch remaining released until the switch lever has again been shifted at the end of the forward stroke of the cam table.

With respect to the solenoids 104 and 105, which control the radial shifting of the chasers, when the switch lever 168 is in bridging relation to the contacts $e$ and $f$, with the cam table 15 moving rearward as shown, the circuit of each solenoid 105 is closed and the circuit of each solenoid 104 is opened, thereby holding the cam-ring 99 in the position shown in Fig. 11 with the chasers in cutting position. Upon a reversal of the stroke of the table 15 the shifting of the switch lever 168 opens the circuits of the solenoid 105 and closes the circuits of the solenoid 104 so that the chasers are expanded from cutting position during the outward strokes of the carrier-head.

During the outward stroke of the carrier-head in register with the loading-head 7, the circuit of the solenoid 25 for such carrier-head is closed to maintain the spindle clutch 18, 19 contracted by reason of the bridging of the switch contacts $e$ and $f$ and the closing of the connection between the associated brushes $i$ and $j$ by the contacts $l$ and $m$. When the spindle has entered a set of gears in the carrier-head and has completed its outward stroke the switch lever 168 will be shifted to open the circuit to said solenoid, thereby permitting an expansion of the clutch under the action of the spring 20 to engage the work pieces and draw them rearward from the loading head with the carrier head as it moves rearward.

The general operation of the machine briefly described, is as follows:—The motor 27 being continually driven causes a driving of the shaft 32 in first one direction and then another due to the automatic shifting of the reverse clutch sleeve 36, while the shaft 32 has driving connection with the cam table 15 so that such table will be driven a predetermined distance in one direction or the other by the shaft when the cam 39 or 40 on the table will engage the clutch lever 37 and shift the clutch sleeve 36 to reverse the rotation of the shaft and the consequent rotation of the table. At each rearward or clockwise movement of the cam-table 15, the carrier-heads 16 are forced outward in radial planes and caused to enter the registering cutter-head 6 loading-head 7 and discharging head 8, this movement of the carrier-heads being occasioned by the coaction of the cam grooves 14 with the rollers 13 on the carrier slides 11. During the outward stroke of the carrier-head in register with the loading head 7 its clutch spindle is contracted by reason of the energizing of the associated solenoid 25 thereby permitting the clutch spindle to enter a set of registering work-pieces *a* carried by the loading-head 7. When the carrier head has reached the limit of its outward movement, the solenoid *f* is deenergized, as hereinbefore described, thereby permitting an expansion of the clutch spindle to vertically engage the associated gear set and to then withdraw the gear set from the loading head 7 upon the retracting stroke of the carrier-head, which takes place during the succeeding forward stroke of the cam table. When the cam-table 15 is within approximately one-third of the end of its forward stroke, the pawl 54 which is driven from the shaft 32, will be permitted to engage a ratchet tooth 56 of the set and impart a forward feeding movement to the carrier-table 9 with the cam-table sufficient to place each carrier-head 16 in register with a succeeding head 6, 7 or 8. This movement of the carrier-table advances the last loaded carrier spindle in register with the first cutter-head 6 of the set so that upon the next outward stroke of the carrier-head the gear blanks *a* carried thereby are forced into the cutter-heads for the initial broaching or tooth cutting operation, the chasers 89 of the head being properly adjusted for such purpose.

When the carrier heads have approximately reached the outward limits of their movements, the cam-ring 99 on each cutter-head is moved in clockwise direction by the shifting of the switch lever 168 to bridge the contacts *f* and *g*, thereby opening the circuits of the several solenoids 105 and closing those of the solenoids 104. The movement of the cam-rings 99 in this direction causes a radial retraction of the cutting ends of the chasers to permit the chasers to clear the gears on the reverse or inward movement of the latter, which now takes place by reason of the forward movement of the cam-table 15.

When the cam table 15 in its forward movement traverses approximately two-thirds of its stroke the pawl 54 will have moved into position for its nose to engage a ratchet tooth 56 on the base so that the continued movement of the pawl in clockwise direction will impart a forward movement to the table 9 sufficient to advance the carrier-heads one step. The engagement of the pawl 54 with the ratchet 56 is permitted at such point by reason of the roller on the pawl retracting lever 57 moving outward on the cam portion of the cam 64. It will be understood that for each step of movement of the carrier table the gear cutting operations for each cutter head are repeated as above described, the chasers of each cutter being adjusted to take a predetermined cut from the gears so that when the last cutting operation takes place the cutting of the teeth on the gears is completed. The completed set of gears at the next movement of the carrier table is moved into register with the unloading head 8 so that upon the next outward movement of the associated carrier slide the gears enter the unloading head between the stripper fingers 117. At the end of such outward stroke of the carrier-head the associated solenoid 25 is energized, as hereinbefore described, to effect a contraction of the associated spindle clutch, such contraction being maintained until the carrier head has approximately completed its next inward or retracting stroke, thereby permitting the set of gears to be stripped from the spindle by the fingers 117 during such retracting stroke. The gears as they fall from the spindle, pass downward through the discharge chute 116 to any suitable point of delivery. As each cutter head registers with the slide 120 carrying the grinding unit, the grinding wheel 123 on the outward movement of such slide engages the outer cutting ends of the chasers and effects a sharpening thereof. At the same time the wheel 131 enters the ring 98 in the cutter head and the roller on the crank arm 138 then passes over the cam 139 and imparts a predetermined rotary movement to the wheel 131 and to the rings 98 and 95 to effect a slight outward adjustment of the latter and a consequent adjustment of the chasers to compensate for wear and for the trimming operation. At desired intervals the face of the grinding wheel 123 will be trimmed by turning the crank 149 to move the trimmer point 141 radially across the face of the wheel.

It is evident that I have provided a gear cutting machine which is automatic in its action and adapted to successively feed a set of gear blanks to a carrier member and then to successively act on the blanks to progressively broach or cut the teeth thereon and to then discharge the gears from the carrier member; that the machine may be provided with any number of gear carrying units and cutter heads to suit the speed at which it may be desired to turn out the gears and that the teeth of the cutter heads are automatically adjusted to compensate for wear and also have their cutting ends ground at predetermined periods to maintain the chasers in sharp condition.

I wish it understood that my invention is not limited to any specific construction, arrangement or form of the parts, or to the particular combinations illustrated, as numerous modifications and changes may be made without departing from the spirit of the claims.

Having thus described my invention, what I claim as new, and desire to secure by Letters Patent, is,—

1. In a gear cutting machine, a cutter head having a socket in one end with an annular series of tapered longitudinally extending guideways in its cylindrical wall, a cutter mounted in each guideway for radial and lengthwise adjustment therein, and reciprocatory means for carrying one or more gear blanks and operable to force the blanks into the cutter head and then to retract the same to cut teeth on the blanks.

2. In a gear cutting machine, a member for carrying one or more gear blanks, a cutter head, a plurality of cutters carried by the head and cooperating to form a socket in axial register with the axes of the blanks carried by the member, means operable to reciprocate the member to force the blanks into the cutter head socket to cause a cutting of teeth thereon by the cutters and then to retract the gears from the cutter head, and means operable to hold the cutters in cutting relation during the cutting stroke of the member and to retract the cutters during the retracting stroke of the member.

3. In a gear cutting machine, a cutter head having an annular series of gear tooth cutters, a reciprocally movable carrier for one or more gear blanks, means for moving the carrier forward to force the blanks carried thereby into the set of cutters for partially cutting teeth on the blanks and then to retract the carrier and blanks from the cutter head, and separate means automatically operable to periodically move the cutters radially inward and outward to and from cutting position and to periodically impart a different adjustment to the cutters to compensate for wear.

4. In a gear cutting machine, a cutter head and an annular series of tooth cutting chasers carried by the head to cooperate to simultaneously perform a tooth cutting operation on a gear blank forced into the head within the series of chasers, the chasers being adjustable radially of the head to engage and release a blank and being longitudinally adjustable to compensate for wear.

5. In a gear cutting machine, a socketed cutter head, an annular series of rockable tooth cutting chasers carried by said head within the same and adapted to coperate to cut teeth on a gear forced into the socket formed thereby, and means automatically operable to radially rock the chasers in unison to cutting or clearance position.

6. In a gear cutting machine, a cutter head having a socket therein with an annular series of internal guides, an annular series of chasers carried by said guides for relative inward and outward radial movements and for longitudinal movements at an incline to the head axis, and separate means operable to impart radial and longitudinal movements in unison to the chasers.

7. In a gear cutting machine, a cutter head having a socket therein, an annular series of tooth cutting chasers mounted in the head socket to cooperate to cut teeth on a gear blank forced therein, a member threaded in the head socket for adjustment axially of the socket, and connection between the member and chasers for imparting adjustment from the member to the chasers.

8. In combination a cutter-head having a socket therein, an annular series of chasers mounted in the head socket, a member threaded in the head for adjustment axially thereof, connection between the member and chasers for imparting adjustment from the member to the chasers, and means operable to enter the head and coact with the threaded member to impart rotation thereto.

9. In combination, a cutter-head having a socket therein, an annular series of chasers mounted in the socket for adjusting movements lengthwise thereof to compensate for wear, rotatable means within the head operable, when rotated, to adjust the chasers, and means operable to enter the head and engage and impart rotation to the first means.

10. In combination, a cutter-head having a socket therein, an annular series of chasers mounted in the socket for adjustment longitudinally thereof, a member mounted within the cutter-head for rotary movements therein, and connected to the chasers to longitudinally adjust the same when the member is rotated, a reciprocatory member, a separate rotary means carried by the reciprocatory member for movements therewith toward and away from the head, one of the means being adapted to enter the head and coact with the rotatable member to impart rotation thereto and the other means being adapted to coact with the chasers to sharpen the same.

11. In a machine of the class described, a carrier head, a gear blank holding spindle projecting therefrom and having a normally expanded blank holding clutch, and means operable to release the spindle clutch.

12. In a machine of the class described, a carrier head mounted for reciprocatory movements, a normally expanded clutch spindle carried by the head for holding one or more work blanks, and electrically controlled means operable to periodically contract the clutch spindle.

13. In a gear cutting machine, a carrier head mounted for longitudinal movements, means operable to impart predetermined reciprocatory movements to the head, an expansion clutch spindle projecting from the head for holding one or more gear blanks, means normally retaining the clutch spindle in expanded relation, and means operable to contract the clutch spindle.

14. In combination, a movable carrier member, a spindle rod projected from the member for axial movements and having its spindle end provided with a conical spiral groove, a complemental bushing ribbon encircling the spindle groove and anchored to the member, an expansion of the bushing being effected by a movement of the spindle rod in one direction, means normally urging a movement of the spindle rod in bushing expanded direction, and means automatically operable to periodically move the spindle rod to permit a contraction of the bushing.

15. In a gear cutting machine, a cutter head having an annular set of tooth cutting chasers, a member for carrying one or more gear blanks and movable to force the blanks into the chaser set of the head to cut teeth on the blanks and then to retract the blanks from the head, means operable to move the member to impart gear cutting and retracting movements thereto, and means automatically operable to expand the cutter set to clearance position during the retracting movement of the member and then to contract the chaser set preparatory for a subsequent cut.

16. In a gear cutting machine, a cutter head having an annular set of gear tooth cutters, means operable to periodically contract and expand the cutter set, and means for carrying one or more gear blanks and operable to force the blanks into the cutter set when the set is contracted and to withdraw the blanks therefrom when the cutter set is expanded.

17. In a gear cutting machine, a cutter head having an annular set of gear tooth cutters, automatic means periodically operable to expand and contract the cutter set to clearance and cutting positions respectively, and means for carrying one or more blanks and operable to force the blanks into the heads within the cutter set when the set is contracted, whereby a tooth broaching operation is imparted to the blank, and then withdrawing the blanks from the cutter head when the cutter set is expanded.

18. In a gear cutting machine, an annular set of gear tooth cutters capable of expanding and contracting movements to clearance and cutting positions, respectively, means automatically operable to periodically expand and contract the cutter set, means for carrying one or more gear blanks for movements into and out of the cutter set, and mechanism automatically operable to move the carrier means to force gear blanks into the set of cutters in cutting position and to retract the blanks therefrom when the cutters are in clearance position.

19. In combination, a cutter head having an annular set of chasers therein, a member movable axially of the head and having a work carrying spindle projecting therefrom and an axially yielding bearing carried by the head for supporting the outer end of the spindle.

20. In combination, a cutter head having a socketed bearing head, a plunger mounted for yielding axial movements in the head, and means having a spindle projecting therefrom for carrying one or more work blanks and movable to project the spindle and work blanks into the cutter head, the outer end of the spindle having a bearing on the outer end of the plunger during a portion of the movement of the spindle into the cutter head.

21. In combination, a plurality of cutter heads, a plurality of work blank carriers movable to project blanks carried thereby into respective cutter heads to perform predetermined tooth cutting operations on the blanks and then to retract the blanks from the cutter heads, and means for moving one of the sets of the cutter heads and carrier means relative to the other to cause the work blanks of the different carrying means to be progressively acted on by different cutter heads.

22. In combination, a set of cutter heads, a work blank carrying member, means for relatively moving the carrier member and cutter head set to force the work blanks carried by the member into a registering cutter head to perform a cutting operation on the blanks, and means for relatively shifting the cutter head set and member to successively place the member in axial register with a different cutter head of a set.

23. In combination, a plurality of cutter heads and mechanism operable to carry one or more work blanks, intermittently move the same into register with successive cutter heads and to force the blanks into and out of each cutter head when in register therewith to perform a predetermined cutting operation on the blanks.

24. In combination, a plurality of cutter heads, mechanism operable to carry one or more work blanks, successively move them into register with succeeding cutter heads of the set and force the blanks into and out of each cutter head when in register therewith to perform a predetermined tooth cutting operation on the blanks, and means for periodically adjusting the cutters of each cutter head.

25. In combination, a plurality of cutter-heads, each having a set of movable gear tooth cutters therein, mechanism for carrying one or more work blanks and operable to progressively move the gear blanks into register with successive cutter-heads and to force the blanks into and out of each cutter-head when in register therewith to perform a predetermined tooth cutting operation on the blank, and means for moving the cutters of each set to contract the cutters during one stroke and to expand them during another stroke of the blanks into and out of the registering cutter-head.

26. In combination, a plurality of cutter-heads each having a set of cutters adjustable to compensate for wear, mechanism for carrying one or more work blanks, intermittently move the blanks into register with successive cutter heads and force the blanks into and out of each registering cutter head to perform a predetermined cutting operation on the blanks, and means periodically operable to adjust the cutters of each cutter head to compensate for wear.

27. In combination, a circular series of cutter heads and means operable to carry one or more work blanks for intermittent revoluble movement into register with successive cutter heads and to force the blanks into and out of each cutter head when in register therewith to progressively cut the blanks.

28. In combination, a circular series of cutter heads, a revoluble member, a slide member for carrying one or more work blanks and carried for radial movements by the member and intermittently movable thereby into radial register with successive cutter heads, and means operable to reciprocate the slide member when in register with each cutter head to force the blanks into and out of the cutter head to perform a predetermined cutting operation thereon.

29. In combination, a circular series of cutter heads, a rotary table, a slide carried for radial movements by the table and adapted to carry one or more work blanks for entering a registering cutter head when the slide is reciprocated, whereby to perform a predetermined cutting operation on the blanks, means for periodically moving the table to place the slide in register with successive cutter heads, and means operable to reciprocate the slide when in register with each cutter head.

30. In combination, a circular series of cutter heads having cutter members which have cutters progressively set to perform a successive tooth cutting operation on work blanks, and means carrying a plurality of sets of work blanks and operable to successively place the work blank sets into register with different cutter heads and to move the work blank sets in unison into and out of registering cutter heads.

31. In combination, a circular series of cutter heads, each having cutters, with the cutters of succeeding cutter heads progressively set to perform succeeding work cutting operations, a rotary table, a slide carried by the table for radial movements and carrying one or more work blanks, means for intermittently moving the table to place the slide into register with successive cutter heads, and cam means operable to reciprocate the slide when in register with each cutter head to force the work blanks carried by the slide into and out of a registering cutter head to perform a predetermined cutting operation on the blanks.

32. In combination, a cutter head, a slide for carrying a set of one or more work blanks in register with the head, and means operable to periodically move the slide outward to force its work blanks into the cutter head to perform a predetermined cutting operation on the blanks, then to retract the blanks from the head and then move the slide out of register with the head.

33. In combination, a circular series of cutter heads adapted to progressively act on work blanks to perform successive cutting operations thereon, a rotary member, a carrier head carried by said member for radial movements relative thereto and adapted to carry one or more work blanks, and means automatically operable to move the carrier head to force its work blanks into and out of a registering cutter head to perform a predetermind gear cutting operation on the blanks and then to advance the rotary member to place the carrier head in register with a succeeding cutter head and to again operate the carrier head to force the work blanks into and out of the registering cutter head.

34. In combination, a circular series of cutter heads, a rotary member mounted within the cutter head set, a carrier head for one or more work blanks carried by the rotary member for radial movements relative thereto, an oscillatory cam member operable to impart reciprocatory movements to the carrier head to force its blanks into and out of a registering cutter head to perform a predetermined cutting operation thereon, and mechanism operable to periodically oscillate the oscillatory member to reciprocate the carrier head into and out of a registering cutter-head and to advance the carrier head into register with a succeeding cutter head at a predetermined point in an oscillation of the oscillatory member in one direction.

35. In combination, a plurality of cutter heads, a loading head and a discharging head arranged in circular series, and means operable within the head set to pick up one or more work blanks from the loading head, successively move them into register with each successive cutter head and force the blanks into and out of each head as it registers therewith to perform a predetermined cutting operation on the blanks and then to move the cut blanks into the unloading head and discharge the blanks therein.

36. In combination, a plurality of cutter heads, a loading head and a discharging head arranged in circular series, means operable within the head set to pick up one or more work blanks from the loading head, successively move them into register with each successive cutter head and force the blanks into and out of each head as it registers therewith to perform a predetermined tooth cutting operation on the blanks and then to move the cut blanks into the discharging head and discharge the blanks therein, and means operable periodically to sharpen the cutters of each cutter head.

37. In combination, a plurality of cutter heads, a loading head and a discharging head arranged in circular series, means operable within the head set to pick up one or more work blanks from the loading head, successively move them into register with successive cutter heads and force the blanks into and out of each head as it registers therewith to perform a predetermined cutting operation on the blanks and then to move the cut blanks into the discharging head and discharge the blanks therein, and means periodically operable to adjust the cutters of each cutter head to compensate for wear.

38. In combination, a plurality of cutter heads, a loading head and a discharging head arranged in a circular series, means operable within the head set to pick up one or more work blanks from the loading head, successively move them into register with successive cutter heads and force the blanks into and out of each head as it registers therewith to perform a predetermined cutting operation on the blanks and then to move the cut blanks into the discharging head and discharge the blanks therein, and means operable to periodically sharpen the cutters of each cutter head and to adjust the same to compensate for wear.

39. In combination, a loading head, means for periodically feeding one or more work blanks to said head, and means periodically operable to engage and remove the work blanks from the head and transfer them to a predetermined point for a cutting operation.

40. In combination, a discharge head having a discharge chute, work stripping means associated with said head, a work carrier member mounted for movement into and out of register with the head and for reciprocatory movements into and out of the head when in register therewith, means for holding a set of one or more work blanks on the carrier member, means operable to impart the different movements to the carrier member, and means automatically operable to release the holding means for the work blanks when the blanks are disposed within the discharge head and engaged by the stripper members.

41. In a gear cutting machine, a cutter head having a set of gear tooth cutters therein, and sharpening means periodically movable into register with the cutter head and then into and out of sharpening coaction with the cutters thereof.

42. In combination, a cutter head having a plurality of cutters adjustable to compensate for wear, means within the cutter head operable to adjust the cutters, and means periodically movable into register with the cutter head and then operable both to sharpen the cutters and to impart predetermined adjustment to the cutter adjusting means.

43. In combination, a cutter head having a plurality of cutters adjustable to compensate for wear, means carried by the head and operable to adjust the cutters, a grinding means periodically movable into register with the cutter head and when in such register being operable to grind the cutters and having a part which coacts with the adjusting means at a predetermined point in the movement of the grinding means and is then automatically operable to impart a predetermined adjustment to the adjusting means.

44. In combination, a cutter head, and means having a plurality of work blank carriers successively movable into and out of register with the cutter head and each being operable when in register with the cutter head to force the work blanks into and out of the same to perform a predetermined cutting operation on the blanks.

45. In combination, a cutter head having a series of cutters, and means having a plurality of work blank carriers intermittently movable to successively place successive carriers in register with the cutter head and to move each carrier when in register with a cutter head to force its work blanks into and out of the cutter head to perform a predetermined cutting operation on the blanks.

46. In combination, a cutter head having a complete set of cutters, a movable member, a plurality of work blank carriers carried by the member for movements therewith and for reciprocatory movements relative thereto, and mechanism for intermittently moving the member to successively place the blank carriers into register with the cutter head and then to move the registering carrier to force its blanks into the carrier head to cut the blanks and then to retract the carriers.

47. In combination, a cutter head having a series of cutters, means having a plurality of work blank carriers intermittently movable to successively place successive carriers in register with the cutter head and to move each carrier when in register with a cutter head to force its work blanks into and out of the cutter head to perform a predetermined cutting operation on the blanks, and means automatically operable to retract the cutters from cutting position preparatory to a withdrawal of the blanks from the cutter head.

48. In a gear cutting machine, a cutter head having a complete set of gear tooth cutters movable into and out of gear cutting position, mechanism having a plurality of gear blank carriers operable to successively move the carriers into register with the cutter head and to move each carrier when in register with the head to force its gear blanks into the cutter head and then to retract the blank to cut teeth thereon, and means automatically operable to periodically move the cutters to clearance and cutting positions.

In testimony whereof I have hereunto signed my name to this specification.

HUBERT A. MYERS.